US012098523B2

(12) United States Patent
Nakajima et al.

(10) Patent No.: US 12,098,523 B2
(45) Date of Patent: Sep. 24, 2024

(54) HYDRAULIC CONTROL CIRCUIT

(71) Applicant: Caterpillar SARL, Geneva (CH)

(72) Inventors: Hideki Nakajima, Akashi (JP); Kazushi Yamada, Akashi (JP)

(73) Assignee: Caterpillar SARL, Geneva (CH)

( * ) Notice: Subject to any disclaimer, the term of this patent is extended or adjusted under 35 U.S.C. 154(b) by 22 days.

(21) Appl. No.: 17/922,167

(22) PCT Filed: Apr. 19, 2021

(86) PCT No.: PCT/EP2021/025145
§ 371 (c)(1),
(2) Date: Oct. 28, 2022

(87) PCT Pub. No.: WO2021/219247
PCT Pub. Date: Nov. 4, 2021

(65) Prior Publication Data

US 2023/0167628 A1 Jun. 1, 2023

(30) Foreign Application Priority Data

Apr. 30, 2020 (JP) ................................ 2020-080129

(51) Int. Cl.
*E02F 9/22* (2006.01)
*F15B 13/04* (2006.01)

(52) U.S. Cl.
CPC .......... *E02F 9/2228* (2013.01); *E02F 9/2221* (2013.01); *E02F 9/2235* (2013.01);
(Continued)

(58) Field of Classification Search
CPC ..... E02F 9/2228; E02F 9/2221; E02F 9/2235; F15B 13/0401; F15B 2211/327;
(Continued)

(56) References Cited

U.S. PATENT DOCUMENTS 6,378,303 B1 * 4/2002 Higuchi ................ E02F 9/2239 60/468
11,008,734 B2 * 5/2021 Nakajima ............ E02F 9/2296
(Continued)

FOREIGN PATENT DOCUMENTS

JP H0288005 U 7/1990
JP H1073101 A * 3/1998
(Continued)

OTHER PUBLICATIONS

International Search Report related to Application No. PCT/EP2021/025145; reported on Aug. 18, 2021.
(Continued)

*Primary Examiner* — Thomas E Lazo

(57) ABSTRACT

To achieve improvement of operability and reduction of energy loss, when controlling so that an upper limit pressure of a discharge line becomes a pressure corresponding to an manipulation tool manipulation amount by controlling an increase or decrease of a bypass amount, in a hydraulic control circuit equipped with a bypass valve for controlling a bypass amount flowing from a hydraulic pump to an oil tank. By using a bypass valve control map representing a relationship between a manipulation tool manipulation amount and a spool stroke, the spool stroke of a bypass valve is controlled, and an upper limit pressure of the discharge line is set so that an opening area of the bypass valve is fully closed by a manipulation amount which is larger than a manipulation tool manipulation amount at which the maximum pressure of the discharge line is reached.

2 Claims, 9 Drawing Sheets

(52) U.S. Cl.
CPC ..... *F15B 13/0401* (2013.01); *F15B 2211/327* (2013.01); *F15B 2211/50536* (2013.01); *F15B 2211/526* (2013.01); *F15B 2211/6309* (2013.01)

(58) Field of Classification Search
CPC ...... F15B 2211/50536; F15B 2211/526; F15B 2211/6309
See application file for complete search history.

(56) References Cited

U.S. PATENT DOCUMENTS

| | | | |
|---|---|---|---|
| 2018/0372131 | A1 | 12/2018 | Werner et al. |
| 2020/0308808 | A1 | 10/2020 | Nakajima |

FOREIGN PATENT DOCUMENTS

| | | | | | |
|---|---|---|---|---|---|
| JP | 2000170212 | A | | 6/2000 | |
| JP | 2017020604 | A | | 1/2017 | |
| JP | 2019094973 | A | | 6/2019 | |
| WO | WO-2019101362 | A1 | * | 5/2019 | ............ E02F 9/2217 |

OTHER PUBLICATIONS

Written Opinion and International Search Report for Int'l. Patent Appln. No. PCT/EP2021/025145, mailed Aug. 18, 2021 (15 pgs).

* cited by examiner

HYDRAULIC CONTROL CIRCUIT

CROSS-REFERENCE TO RELATED APPLICATION

This Application is a 35 USC § 371 US National Stage filing of International Application No. PCT/EP2021/025145 filed on Apr. 19, 2021 which claims priority under the Paris Convention to Japanese Patent Application No. 2020-080129 filed on Apr. 30, 2020.

TECHNICAL FIELD

The present invention relates to a technical field of a hydraulic control circuit for a work machine such as a hydraulic excavator.

BACKGROUND ART

In general, a hydraulic control circuit of a work machine such as a hydraulic excavator is configured to include a hydraulic pump; a hydraulic actuator to which a pressure oil is supplied from the hydraulic pump; a manipulation tool that is manipulated so as to actuate the hydraulic actuator; and a control valve that is connected to a discharge line of the hydraulic pump, and configured to perform oil supply and discharge control to/from the hydraulic actuator in accordance with the manipulation of the manipulation tool; and a main relief valve configured to set a maximum pressure of the discharge line, etc. Furthermore, there are some hydraulic control circuits provided with a bypass oil passage (bleed oil passage) that is formed so as to be branched from the discharge line and reaches an oil tank, in order to adjust the pressure of the discharge line of the hydraulic pump; and a bypass valve (bleed valve) that is disposed in the bypass oil passage, and controls a bypass amount (bleed amount) flowing from the hydraulic pump to the oil tank in response to a control signal that is output from a control device (see, for example, Patent Literatures 1, 2 and 3).

Such a bypass valve is controlled so that the opening area decreases, that is, the bypass amount decreases with an increasing manipulation amount of the manipulation tool. In this case, the hydraulic control circuit disclosed in Patent Literature 1 is configured such that the opening area of the bypass valve is controlled so as to follow a flow rate curve that is set beforehand, as a function of the stroke of the control valve (operation valve). Further, the hydraulic control circuit disclosed In Patent Literature 2 is configured to control a movement stroke of the bypass valve by using a table representing a relationship between a manipulation signal of the manipulation tool and a spool movement stroke of the bypass valve. Further, the hydraulic control circuit disclosed in Patent Literature 3 is configured to cause the opening area of the bypass valve to be proportionally decreased with an increasing manipulation amount.

PRIOR ART LITERATURES

Patent Literatures

[PATENT LITERATURE 1] Japanese Utility Model Application Laid-Open No. 2-88005

[PATENT LITERATURE 2] Japanese Patent Application Laid-Open No. 2017-20604

[PATENT LITERATURE 3] Japanese Patent Application Laid-Open No. 2019-94973

SUMMARY OF THE INVENTION

Problems to be Solved by the Invention

Meanwhile, in such a hydraulic control circuit as described above, the maximum pressure of the discharge line of the hydraulic pump is set by the main relief valve, while the upper limit pressure of the discharge line is adjusted by controlling the increase and decrease of the opening area of the bypass valve corresponding to the manipulation tool manipulation amount. For this reason, when controlling the opening area of the bypass valve, it is necessary to consider a relationship between a maximum pressure of the discharge line set by the main relief valve and an upper limit pressure of the discharge line adjusted by the bypass valve. However, any of the hydraulic control circuits disclosed in the above Patent Literatures 1 to 3 has not considered the above-described relationship. For this reason, a manipulation tool manipulating region in which the upper limit pressure can be adjusted by the bypass valve might be narrowed, resulting in impairing the operability, and oil might continue to flow from the bypass valve to the oil tank even after the discharge line reaches the maximum pressure, resulting in energy loss.

Furthermore, when the pressure of the discharge line of the hydraulic pump is high, for the bypass valve of a spool type, oil might leak from the bypass valve, depending on an overlapping length between a land portion of the spool of the bypass valve and a sliding contact portion of a housing with which the land part comes into sliding contact, even when the bypass valve is fully closed, and these are problems to be solved by the present invention.

Means for Solving the Problems

The present invention has been created with an aim of solving these problems in view of the above actual situations. A hydraulic control circuit for a work machine according to Claim 1 of the present invention comprises a hydraulic pump; a hydraulic actuator to which a pressure oil is supplied from the hydraulic pump; a manipulation tool that is manipulated so as to actuate the hydraulic actuator; a control valve that is connected to a discharge line of the hydraulic pump, and configured to perform oil supply and discharge control to/from the hydraulic actuator, in accordance with the manipulation of the manipulation tool; a main relief valve configured to set a maximum pressure of the discharge line; a bypass oil passage that is formed so as to be branched from the discharge line and reaches an oil tank; and a spool type bypass valve disposed on the bypass oil passage, and configured to control a bypass amount flowing from the hydraulic pump to the oil tank in response to a control signal that is output from a control device, wherein, the bypass valve is configured such that an opening area increases or decreases associated with displacement of the spool, in controlling so that an upper limit pressure of the discharge line becomes a pressure corresponding to a manipulation tool manipulation amount by controlling an increase or decrease of a bypass amount in accordance with a manipulation tool manipulation amount; on the other hand, the control device is provided with a map representing a relationship between a manipulation tool manipulation amount and a spool displacement amount, and controls the spool displacement amount of the bypass valve as a function of the manipulation tool manipulation amount, on the basis of the map; and the map is set such that the upper limit pressure of the discharge line is a pressure corresponding to a spool displacement amount that causes the opening area of the bypass valve to be fully closed by a manipulation amount larger than the manipulation tool manipulation amount at which the maximum pressure of the discharge line is reached.

A hydraulic control circuit for a work machine according to Claim 2 of the present invention is the hydraulic control circuit according to Claim 1, configured to control the spool displacement amount as a function of the manipulation tool manipulation amount by using the map even in the fully closed state of the bypass valve, in order to control an overlapping length between a land portion of the spool of the bypass valve and a sliding contact portion of a housing with which the land portion comes into sliding contact in the fully closed state of the bypass valve.

A hydraulic control circuit for a work machine according to Claim 3 of the present invention is the hydraulic control circuit according to Claim 2, wherein the control device is configured to vary the overlapping length between the land portion of the spool and the sliding contact portion of the housing in the fully closed state of the bypass valve according to the pressure of the discharge line, by inputting a signal from a pressure detecting means for detecting the pressure of the discharge line of the hydraulic pump and varying the map according to the input pressure of the discharge line.

Favorable Effects of the Invention

According to Claim 1 of the present invention, the manipulating region of the hydraulic actuator manipulation tool can be made as wide as possible where the increase or decrease of the upper limit pressure can be controlled by the bypass valve, which can contribute to improvement of operability and reduction of energy loss.

According to Claim 2 of the present invention, it is possible to control an overlapping length between the land portion of the spool in the fully closed state and the sliding contact portion of the housing with which the land portion comes into sliding contact.

According to Claim 3 of the present invention, it is possible to prevent oil leakage from the bypass valve by increasing the overlapping length even when the discharge line is high.

DETAILED DESCRIPTION OF THE INVENTION

Hereinafter, embodiments of the present invention will be described with reference to the drawings.

Figure 1:
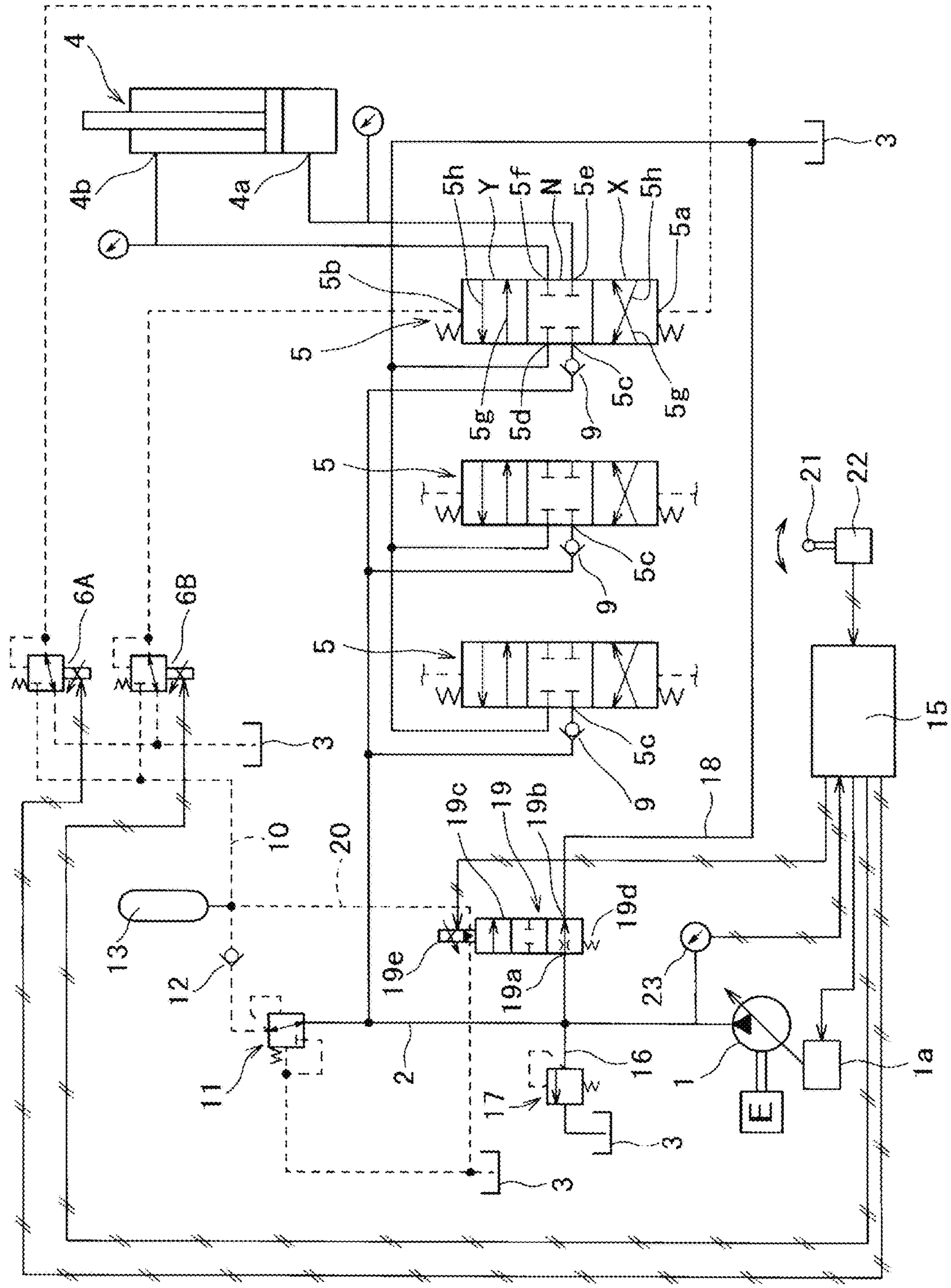
FIG. 1 is a hydraulic control circuit diagram of a first embodiment.

First, a first embodiment of the present invention will be described with reference to FIGS. 1 to 5. FIG. 1 is a schematic illustration of a hydraulic control circuit for a hydraulic excavator which is an example of a work machine. In FIG. 1, reference numeral 1 denotes a variable capacity type hydraulic pump driven by an engine E; reference numeral 1*a* denotes a capacity-varying means of the hydraulic pump 1; reference numeral 2 denotes a discharge line of the hydraulic pump 1; reference numeral 3 is denotes an oil tank; reference numeral 4 denotes a hydraulic actuator that operates as an oil pressure supply source by using the hydraulic pump 1; reference numeral 5 denotes a pilot-operated control valve that performs control of oil supply and discharge to/from the hydraulic actuator 4; reference numerals 6A, 6B denote a first and a second electromagnetic proportional pressure-reducing valves that output a pilot pressure so as to operate the control valve 5.

The hydraulic excavator is provided with various types of hydraulic actuators such as a boom cylinder, a stick cylinder, a bucket cylinder, a traveling motor, and a swivel motor, and provided with respective control valves in association with respective hydraulic actuators, besides provided with electromagnetic proportional pressure-reducing valves that output a pilot pressure to operate the respective control valves. In FIG. 1, however, on behalf of these hydraulic actuators, control valves, and electromagnetic proportional pressure-reducing valves, there are only illustrated one hydraulic actuator (hydraulic cylinder) 4 and a control valves 5 corresponding to the hydraulic actuator 4, a first and a second electromagnetic proportional pressure-reducing valves 6A, 6B corresponding to the control valve 5, and two other control valves 5 corresponding to two other hydraulic actuators (not illustrated) respectively.

The control valve 5 is a closed center type spool valve, and is configured to include a first and a second pilot ports 5*a*, 5*b* respectively connected to the first and second electromagnetic proportional pressure-reducing valves 6A, 6B; a pump port 5*c* connected to the discharge line 2 of the hydraulic pump 1; a tank port 5*d* connected to the oil tank 3; and a pair of actuator ports 5*e*, 5*f* respectively connected to respective ports 4*a*,4*b* of the hydraulic actuator 4. Further, the control valve 5 is configured such that, in a state where no pilot pressure is input to both the first and second pilot ports 5*a*, 5*b*, the spool is located at a neutral position N at which the pump port 5*c*, the tank port 5*d*, and the pair of actuator ports 5*e*, 5*f* are closed; however, when the pilot pressure is input from the first or second electromagnetic proportional pressure-reducing valve 6A or 6B to the first or second pilot port 5*a* or 5*b*, the spool is switched to a first operating position X or a second operating position Y at which a supply flow passage 5*g* extending from the pump port 5*c* to one actuator port 5*e* or 5*f*, and a discharge flow passage 5*h* extending from the other actuator port 5*f* or 5*e* to the tank port 5*d* are opened to perform supply flow rate control and discharge flow rate control to/from the hydraulic actuator 4.

In the present embodiment, each of the control valves 5 is connected in parallel with respect to the hydraulic pump 1, and a check valve 9 is disposed in oil passage on an upstream side of the pump port 5*c* of each of the control valves 5 to hold a load pressure of the hydraulic actuator 4.

Furthermore, in FIG. 1, reference numeral 10 denotes a pilot primary side oil passage for supplying a pilot primary pressure to the first and second electromagnetic proportional pressure-reducing valves 6A, 6B, and the pilot primary side oil passage 10 is formed so as to be branched from the discharge line 2 of the hydraulic pump 1 via a pressure-reducing valve 11. That is, the pressure-reducing valve 11 reduces pressure of the hydraulic pump 1, which is a common oil pressure supply source with the hydraulic actuator 4, to generate a predetermined pilot primary pressure Pp, and is designed to supply the pilot primary pressure Pp to the first and second electromagnetic proportional pressure-reducing valves 6A, 6B via the pilot primary side oil passage 10. However, in the pilot primary side oil passage 10, a check valve 12 for holding the pilot primary pressure Pp and an accumulator 13 for smoothing the pilot primary pressure are disposed in this order from the upstream side (the pressure-reducing valve 11 side). The first and second electromagnetic proportional pressure-reducing valves 6A, 6B do not output the pilot pressure in a non-operating state, but operate in response to a control signal that is output from the controller 15, which will be described below, to reduce the input pilot primary pressure Pp and output it to the first and second pilot ports 5*a*, 5*b* of the control valve 5. Then, the control valve 5 is designed to be switched from the neutral position N to the first operating position X or the second operating position Y, as described above, by the pilot pressure that is output from the first and second electromagnetic proportional pressure-reducing valves 6A, 6B, and to perform the supply flow rate control and the discharge flow rate control to/from the hydraulic actuator 4. In this case, the pilot pressure that is output from the first, second electromagnetic proportional pressure-reducing valves 6A, 6B is controlled to increase or decrease in accordance with the manipulation amount of the hydraulic actuator manipulation tool (corresponding to the manipulation tool of the present invention) 21 by the controller 15. The spool displacement amount of the control valve 5 increases or decreases in accordance with the increase or decrease of the pilot pressure, so that an increase or decrease of the opening areas of the supply flow passage 5*g* and the discharge flow passage 5*h* is controlled, thereby performing the control of the increase or decrease of the supply flow rate and the discharge flow rate.

A hydraulic actuator manipulation tool 21 and a manipulation detecting means 22 for detecting the manipulation (manipulation amount and manipulation direction) of the hydraulic actuator manipulation tool 21 are respectively provided in association with respective hydraulic actuators, but FIG. 1 illustrates only the manipulation tool 21 and the manipulation detecting means 22 corresponding to one hydraulic actuator 4.

Furthermore, in FIG. 1, reference numeral 16 denotes a main relief oil passage that is formed so as to be branched from the discharge line 2 of the hydraulic pump 1 and reaches the oil tank 3, and a main relief valve 17 configured to set a maximum pressure (system pressure) of the discharge line 2 is disposed in the main relief oil passage 16.

Furthermore, in FIG. 1, reference numeral 18 denotes a bypass oil passage that is formed so as to be branched from the discharge line 2 of the hydraulic pump 1 and reaches the oil tank 3, and in the bypass oil passage 18, there is disposed a bypass valve (bleed valve) 19 configured to control a bypass amount (bleed amount) flowing from the hydraulic pump 1 to the oil tank 3 via the bypass oil passage 18. The bypass valve 19 comprises an inlet side port 19*a* connected to the hydraulic pump 1, an outlet side port 19*b* connected to the oil tank 3, and a housing (not illustrated) having these inlet side and outlet side ports 19*a*, 19*b*, a spool 19*c* inserted into the housing so as to be freely movable in an axial direction, a spring 19*d* that is provided on one end side of the spool 19*c* and urges the spool 19*c* to an initial position, and a proportional solenoid 19*e* that is provided on the other end side of the spool 19*c* and causes the spool 19*c* to move against an urging force of the spring 19*d*, and the like. Further, the bypass valve 19 is configured such that the pilot primary pressure Pp acts on the other end side of the spool 19*c* via an introduction oil passage 20 that is formed so as to be branched from the pilot primary side oil passage 10. Then, the stroke (displacement amount from the initial position) of the spool 19*c* is controlled to increase or decrease by controlling the increase or decrease of a current value applied to the proportional solenoid 19*e* as a control signal from the controller 15, and the bypass amount flowing from the hydraulic pump 1 to the oil tank 3 via the bypass oil passage 18 is controlled in accordance with the opening areas of the bypass valve 19 corresponding to the stroke.

Figure 2:
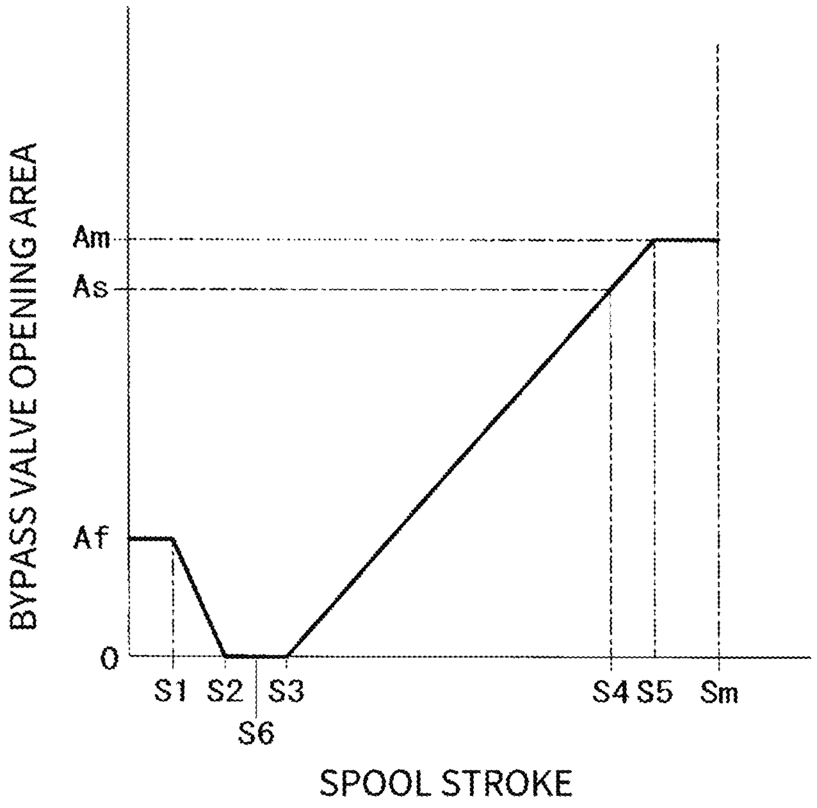
FIG. 2 is a diagram representing a relationship between a spool stroke and a bypass valve opening area in the first embodiment.

Meanwhile, a relationship between a stroke and an opening area of the spool 19*c* of the bypass valve 19 will be described with reference to FIG. 2. In a state in which no electric current is applied to the proportional solenoid 19*e*, the spool 19*c* is located at the initial position (stroke "0") by the urging force of the spring 19*d*, but at the initial position, the opening area of the bypass valve 19 is set to be an initial opening area Af that is smaller than a setting opening area As, which will be described below. Then, the spool 19*c* is displaced from the initial position by an electric current that is applied to the proportional solenoid 19*e*, and the stroke of the spool 19*c* increases with an increasing electric current value applied to the proportional solenoid 19*e*. In this case, the opening area is maintained at the initial opening area Af until the stroke reaches the first stroke S1 from the initial position, and the opening area decreases as the stroke increases until reaching the second stroke S2 (S1<S2) from the first stroke S1, and when reaching the second stroke S2, the opening area of the bypass valve 19 is set to "0", that is, to be fully closed. Then, this fully closed state (opening area A=0) is maintained after the stroke increases from the second stroke S2 until reaching a third stroke S3 (S2<S3). Furthermore, when the stroke of the spool 19*c* increases from the third stroke S3, the bypass valve 19 is opened. In this case, however, the opening area also increases as the stroke increases, and the opening area reaches the setting opening area As which is larger than the initial opening area Af and is slightly smaller than the maximum opening area Am when the stroke reaches a fourth stroke S4 (S3<S4) before the stroke reaches a maximum stroke Sm. Furthermore, the opening area reaches a maximum opening area Am when the stroke reaches a fifth stroke S5 (S4<S5) which is slightly moved from the fourth stroke S4, and the maximum opening area Am is maintained until reaching the maximum stroke Sm (S5<Sm) from the fifth stroke S5. In FIG. 2, a sixth stroke S6 is a stroke (S2<S6<S3) between the second stroke S2 and the third stroke S3 at which the opening area is maintained at "0". The stroke S6 will be described below.

Figure 3:
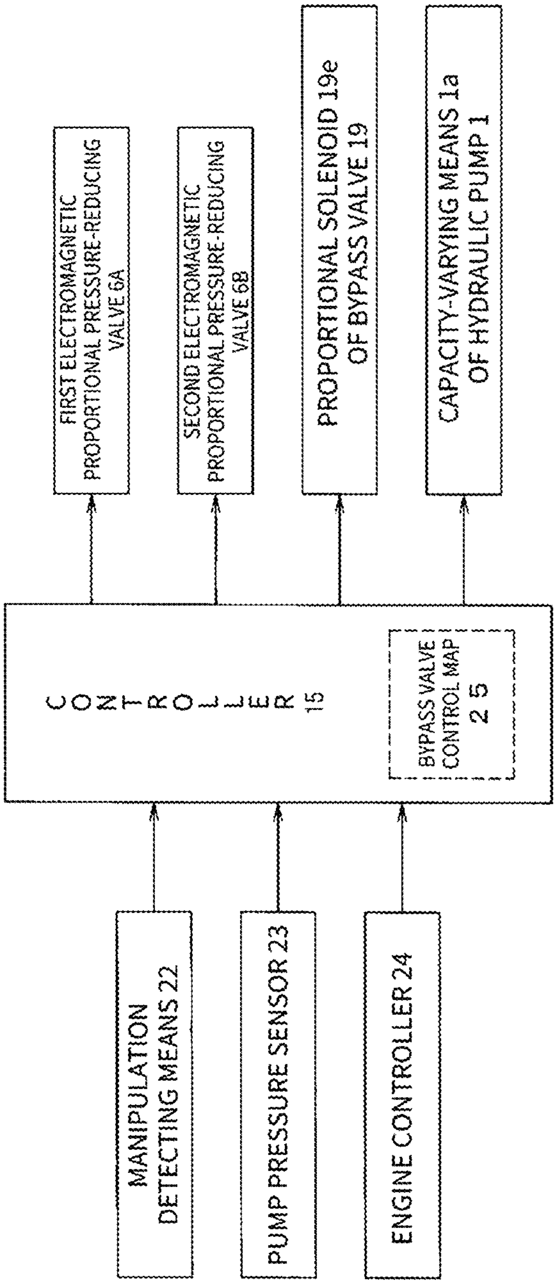
FIG. 3 is a block diagram illustrating input/output of a controller in the first embodiment.
Figure 4:
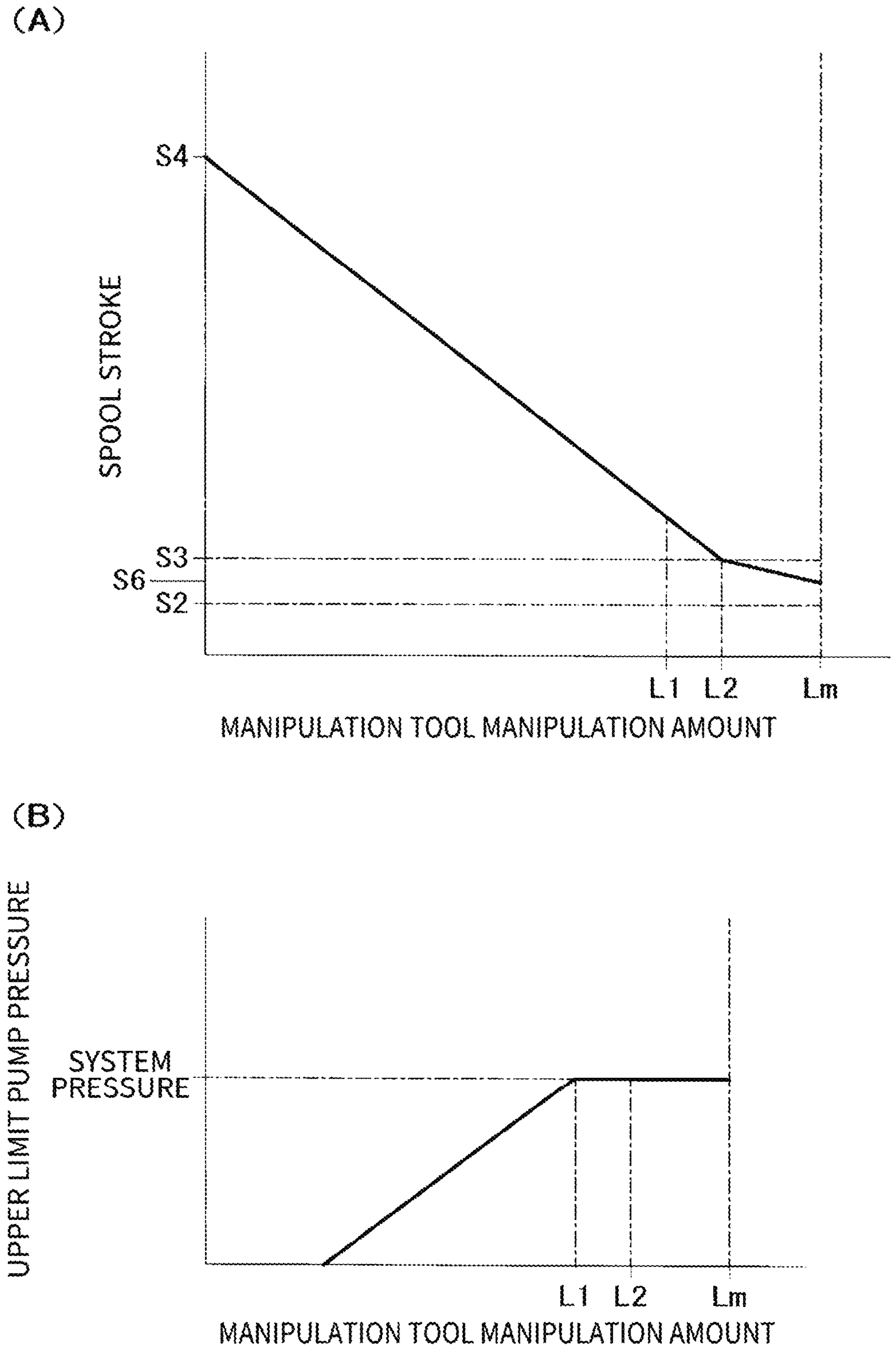
FIG. 4: (A) is a diagram illustrating a bypass valve control map of the first embodiment, and (B) is a diagram illustrating a relationship between a manipulation tool manipulation amount and an upper limit pump pressure.

On the other hand, the controller (which corresponds to the control device of the present invention) 15, as illustrated in the block diagram of FIG. 3, is configured to input signals from the manipulation detecting means 22 for respectively detecting the manipulations of respective hydraulic actuator manipulation tools 21, and the pump pressure sensor (which corresponds to the pressure detecting means of the present invention) 23 for detecting the pressure (pump pressure) of the discharge line 2 of the hydraulic pump 1, the engine controller 24, etc., and to output control signals to the first, second electromagnetic proportional pressure-reducing valves 6A, 6B, the proportional solenoid 19*e* of the bypass valve 19, the capacity-varying means 1*a* of the hydraulic pump 1, etc., in response to these input signals, and is provided with a bypass valve control map (which corresponds to a map of the present invention) 25 as will be described below.

The stroke of the spool 19*c* of the bypass valve 19 is controlled in accordance with a current value applied from the controller 15 to the proportional solenoid 19*e* as described above. However, the control of the stroke of the bypass valve 19 by the controller 15 will be described. First, before the engine E is started, no electric current is applied from the controller 15 to the proportional solenoid 19*e*, and the bypass valve 19 is located at the initial position by an urging force of the spring 19*d*. Furthermore, the opening area of the bypass valve 19 at the initial position is set to an initial opening area Af as described above. The initial opening area Af is set to an opening area (Af<As) smaller than the setting opening area As as described above, which is a minimum opening area necessary for causing the discharge oil of the hydraulic pump 1 to escape into the oil tank 3 immediately after the engine is started, in order to prevent the pump pressure from rapidly rising immediately after the start of the drive of the hydraulic pump 1 associated with the engine start and prevent an excessive load from being applied to the engine E.

On the other hand, when the engine E starts and the hydraulic pump 1 starts driving accordingly, an electric current is not applied from the controller 15 to the proportional solenoid 19*e* of the bypass valve 19 and the spool 19*c* is maintained at the initial position, that is, the opening area of the bypass valve 19 is maintained at the initial opening area Af, until the pump pressure detected by the pump pressure sensor 23 reaches a required pressure Po. This will enable preventing a rapid rise in the pump pressure immediately after the start of the engine drive, and will enable making a pump pressure rising speed until reaching a required pressure Po faster, compared with the case where the opening area of the bypass valve at the time of starting the engine is set to the maximum opening area (for example, a case like the bypass valve 33 in the second embodiment described below). The required pressure Po is a value larger than the pilot primary pressure Pp so that a predetermined pilot primary pressure Pp can be supplied from the hydraulic pump 1 to the pilot primary side oil passage 10, and a small value, for example about 4 Mpa, is desirable from the viewpoint of energy saving.

Then, after the pump pressure reaches the required pressure Po, the controller 15 applies an electric current to the proportional solenoid 19*e* so that the stroke of the spool 19*c* reaches a fourth stroke S4, in a state in which a manipulation signal is not input from the manipulation detecting means 22, that is, in a state in which the hydraulic actuator manipulation tool 21 is not manipulated (the manipulation tool is at the neutral position). This will enable the opening area of the bypass valve 19 to reach a setting opening area As. The setting opening area As, however, is an opening area at which the pressure of the discharge line 2 is maintained at a pressure of the order of the required pressure Po, and an opening area larger than the initial opening area Af, in a state in which the discharge amount of the hydraulic pump 1 is of the order of a predetermined amount, and as described above, when the engine speed E is of the order of a predetermined speed (for example, rated speed). Further, until the pump pressure reaches the required pressure Po from the start of the engine E, the controller 15 will not output a control signal of actuation to the first and second electromagnetic proportional pressure-reducing valves 6A, 6B even if the hydraulic actuator manipulation tool 21 is manipulated, so that the control valve 5 is to be held in the neutral position N at which the pressure oil is not supplied to the hydraulic actuator 4. Furthermore, when the manipulation signal is not input from the manipulation detecting means 22 for a predetermined time or more, the controller 15 applies an electric current to the proportional solenoid 19*e* so that the stroke of the spool 19*c* becomes the fifth stroke S5, and sets an opening area of the bypass valve 19 to the maximum opening area Am. This will enable reduction of pressure loss of the bypass oil passage 18 in a case where the hydraulic actuator manipulation tool 21 is not manipulated for a predetermined time or longer.

Meanwhile, as described above, it is configured such that the pilot primary pressure Pp acts on the other end side (opposite side of 19*d*) of the spool 19*c* of the bypass valve 19 via the introduction oil passage 20 that is formed so as to be branched from the pilot primary side oil passage 10. For this reason, when the pressure of the discharge line 2 is lowered below the required pressure Po and becomes less than the pilot primary pressure Pp, while the hydraulic actuator manipulation tool 21 is not manipulated, the pilot pressure acting on the other end side of the spool 19*c* of the bypass valve 19 becomes smaller, and the spool 19*c* moves in a direction in which the stroke decreases from the fourth stroke S4 or the fifth stroke S5. This will enable making adjustment so that the opening area of the bypass valve 19 decreases and the pressure of the discharge line 2 reaches the required pressure Po.

Further, the bypass valve 19, as described above, is located at an initial position by the urging force of the spring 19*d*, in a state where no electric current is applied to the proportional solenoid 19*e* from the controller 15, and the opening area of the bypass valve 19 at the initial position is set to the initial opening area Af. As a result, even granted that malfunction occurs in the bypass valve 19 due to certain defects in an electrical system extending from the controller 15 to the proportional solenoid 19*e*, the bypass oil passage 18 would be opened by the bypass valve 19, and a rapid rise in the pump pressure at the start of the engine or non-startable state of not starting the engine could be avoided, and since the initial opening area Af, which is an opening area of the bypass valve 19 in this case, is an opening area that is smaller than the setting opening area As that is an opening area of the bypass valve 19 when the manipulation tool is at the neutral position, the pressure of the discharge line 2 will also rise above the required pressure Po when the manipulation tool is at the neutral position, and it becomes possible to perform minimum operations necessary for emergency evacuation of the work machine and the like, even if the bypass valve 19 ceases to operate.

Next, the control of the bypass valve 19 in a case where the hydraulic actuator manipulation tool 21 is manipulated after the engine E is started and the pump pressure reaches the required pressure Po will be described. In this case, the controller 15 controls the stroke of the spool 19*c* by using a bypass valve control map 25, which will be described below.

The bypass valve control map 25, as illustrated in FIG. 4(A), is a map representing a relationship between a manipulation amount of the hydraulic actuator manipulation tool 21 (manipulation tool manipulation amount) that is input from the manipulation detecting means 22 and a stroke of the spool 19*c*, which is set for each hydraulic actuator 4. For example, in a hydraulic excavator, respective bypass valve control maps 25 are individually set with respect to respective hydraulic actuators, such as extension side and retraction side of a boom cylinder, extension side and retraction side of a stick cylinder, extension side and retraction side of a bucket cylinder, a traveling motor, and a swivel motor. This bypass valve control map 25 is created as a map that represents a relationship between a manipulation tool manipulation amount and a stroke of the spool 19*c*, by determining an opening area of the bypass valve 19 for setting the upper limit pressure of the discharge line 2 to the upper limit pressure corresponding to the manipulation tool manipulation amount, and further by determining a stroke of the spool 19*c* at which the relevant opening area is reached, so that a relationship between a manipulation tool manipulation amount and an upper limit pressure of the discharge line 2 (the pressure of the discharge line 2 when the pressure oil is not supplied to the hydraulic actuator 4 because the piston is located at the cylinder end, for example) becomes a relationship of beforehand-set pressure characteristics. In this case, the relationship of the beforehand-set pressure characteristics, as illustrated in FIG. 4(B), is set so that the upper limit pump pressure (upper limit pressure of the discharge line 2) reaches the system pressure (the maximum pressure, for example 35 Mpa, of the discharge line 2 set by the main relief valve 17) when the manipulation tool manipulation amount is a first manipulation amount L1; and in the bypass valve control map 25, as illustrated in FIG. 4(A), the relationship of the beforehand-set pressure characteristics is set to reach a third stroke S3 when the opening area of the bypass valve 19 becomes "0" at a second manipulation amount L2 which is slightly increased larger than the first manipulation amount L1. In this case, the stroke of the spool 19*c* is controlled so that the change in the opening area during the time until the opening area of the bypass valve 19 becomes "0" after the upper limit pump pressure reaches the system pressure is performed smoothly associated with the increase of the manipulation tool manipulation amount from the first manipulation amount L1 to the second manipulation amount L2.

It may be better to perform special control in some cases, for example, to control the upper limit pump pressure so as to be lower than the system pressure at boom lowering of the hydraulic excavator. In such a case, the opening area of the bypass valve 19 is set so as to avoid "0" even when the manipulation tool manipulation amount is maximal.

When the control of the bypass valve 19 by the controller 15 using the bypass valve control map 25 is described with reference to FIG. 4(A), in a state where the hydraulic actuator manipulation tool 21 is not manipulated (the manipulation tool manipulation amount is "0", the manipulation tool at the neutral position), the spool 19*c* is controlled to stay at the fourth stroke S4, as described above. Then, when the hydraulic actuator manipulation tool 21 is manipulated, the spool 19*c* is controlled to move in a direction in which the stroke decreases as the manipulation tool manipulation amount increases, that is, in a direction in which the opening area of the bypass valve 19 decreases; and when manipulation tool manipulation amount is manipulated up to the second manipulation amount L2, the spool 19*c* is controlled so that the stroke reaches the third stroke S3 at which the opening area of the bypass valve 19 becomes "0". Furthermore, the controller 15 controls the stroke of the spool 19*c* in accordance with the increase in the manipulation tool manipulation amount even after the opening area of the bypass valve 19 becomes "0".

The stroke of the spool 19*c* when the opening area of the bypass valve 19 becomes "0", that is, an electric current value applied to the proportional solenoid 19*e* corresponding to the position of the third stroke S3 is desirably corrected by calibration or the like.

Further, in an interlocking operation in which a plurality of hydraulic actuators 4 are simultaneously operated, the stroke of the spool 19*c* of the bypass valve 19 is calculated on the basis of the manipulation amounts of respective hydraulic actuator manipulation tools 21 that is input from the manipulation detecting means 22 and the bypass valve control maps 25 for respective hydraulic actuators.

Meanwhile, the control of the stroke of the spool 19*c* after the opening area of the bypass valve 19 becomes "0" will be described with reference to a partial enlarged view of the bypass valve control map 25 illustrated in FIG. 5. The controller 15 changes the bypass valve control map 25 in response to the present pump pressure of the discharge line 2 that is input from the pump pressure sensor 23, after the opening area of the bypass valve 19 becomes "0". In this case, when the pump pressure that is input from the pump pressure sensor 23 is higher than a setting pressure which is beforehand set (for example, 35 MPa), even after the stroke of the spool 19*c* reaches the third stroke S3 at which the opening area of the bypass valve 19 becomes "0", as illustrated by the solid line in FIG. 5, the stroke of the spool 19*c* is set to decrease as the manipulation tool manipulation amount increases, that is, to be displaced toward the second stroke S2 direction. When the manipulation tool manipulation amount reaches the maximum (maximum manipulation amount Lm), the spool 19*c* is controlled so as to stay at a sixth stroke S6 which is an intermediate stroke between the third stroke S3 and the second stroke S2. The sixth stroke S6 is located in between the third stroke S3 at which the opening area of the bypass valve 19 is maintained at "0" and the second stroke S2, which is a position at which an overlapping length between a land portion of the spool 19*c* and a sliding contact portion of the housing that comes into sliding contact with the land portion is the longest. The spool 19*c* staying at the sixth stroke S6 can reliably prevent oil leakage from the bypass valve 19 even when the pump pressure is high.

Figure 5:
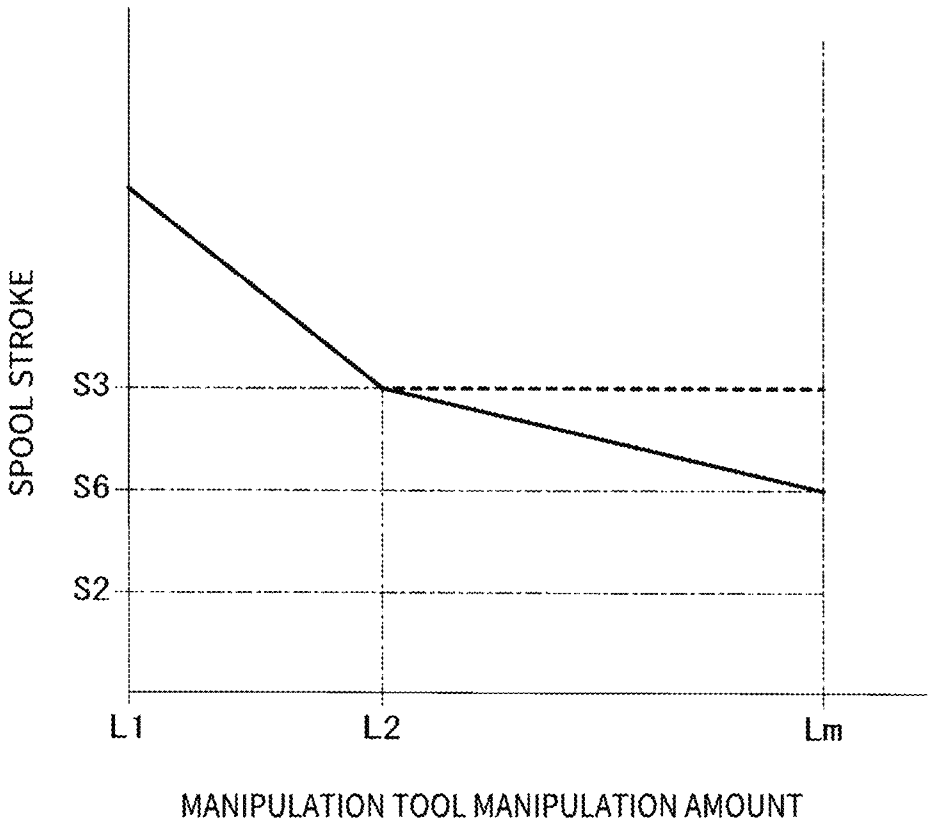
FIG. 5 is a diagram illustrating changes in the bypass valve control map in the first embodiment.

On the other hand, when the pump pressure that is input from the pump pressure sensor 23 becomes lower than the setting pressure, the bypass valve control map 25 is changed so that the displacement in a direction from the third stroke S3 toward the second stroke S2 after the opening area of the bypass valve 19 has become "0", decreases as the pump pressure becomes low, and is set so that, when the pump pressure is sufficiently low (for example, 5 MPa), the spool 19*c* is located at the third stroke S3, even when the manipulation tool manipulation amount reaches a maximum manipulation amount Lm, as illustrated by the dotted line in FIG. 5. As a result, when the pump pressure is low enough to prevent the risk of leakage of the spool 19*c*, the spool 19*c* will be immediately moved in a direction of the fourth stroke S4 to open the opening of the bypass valve 19 with a decreasing manipulation amount of the manipulation tool, resulting in good responsiveness of the bypass valve 19 to the manipulation of the manipulation tool.

In the present embodiment configured as described above, the hydraulic control circuit of the hydraulic excavator is configured to include a hydraulic pump 1; a hydraulic actuator 4 to which a pressure oil is supplied from the hydraulic pump 1; a hydraulic actuator manipulation tool 21 manipulated in order to actuate the hydraulic actuator 4; a control valve 5 connected to the discharge line 2 of the hydraulic pump 1, and configured to perform oil supply/discharge control to/from the hydraulic actuator 4, in accordance with the manipulation of the hydraulic actuator manipulation tool 21; a main relief valve 17 configured to set a maximum pressure of the discharge line 2; a bypass oil passage 18 that is formed so as to be branched from the discharge line 2 and reaches an oil tank 3; a spool type bypass valve 19 disposed on the bypass oil passage 18, and configured to control a bypass amount flowing from the hydraulic pump 1 to the oil tank 3 in response to a control signal that is output from the controller 15, and so on. In this hydraulic control circuit, the bypass valve 19 is configured such that the opening area increases or decreases associated with the displacement of the spool 19*c*, in controlling so that the upper limit pressure of the discharge line 2 becomes a pressure corresponding to the manipulation tool manipulation amount, by controlling increase or decrease of the bypass amount as a function of the manipulation amount of the hydraulic actuator manipulation tool 21; on the other hand, the controller 15 is provided with a bypass valve control map 25 representing a relationship between a manipulation tool manipulation amount and a spool stroke (displacement amount of the spool 19*c*), and controls the spool stroke of the bypass valve 19 as a function of the manipulation tool manipulation amount, on the basis of bypass valve control map 25; and in the bypass valve control map 25, the upper limit pressure of the discharge line 2 is set to become a pressure corresponding to the spool stroke (the third stroke S3 in the first embodiment) at which the opening area of the bypass valve 19 is fully closed by a second manipulation amount L2 which is a manipulation amount larger than a first manipulation amount L1 at which the maximum pressure of the discharge line 2 is reached.

Therefore, the displacement amount of the spool 19*c* of the bypass valve 19 is controlled in accordance with the manipulation tool manipulation amount by using the bypass valve control map 25. The upper limit pressure of the discharge line 2 will be controlled to become a pressure corresponding to the manipulation amount of the hydraulic actuator manipulation tool 21, in accordance with the increase or decrease of the opening area of the bypass valve 19 associated with the displacement of the spool 19*c*; in this case, however, the upper limit pressure of the discharge line 2 will be controlled so that the opening area of the bypass valve 19 is fully closed at the second manipulation amount L2 which is a larger manipulation amount than the first manipulation amount L1 at which the maximum pressure of the discharge line 2 is reached. As a result, until the upper limit pressure of the discharge line 2 reaches the maximum pressure of the discharge line 2, the upper limit pressure of the discharge line 2 will be able to be controlled to become a pressure corresponding to the manipulation tool manipulation amount, by controlling the increase/decrease of the opening area of the bypass valve 19, and the manipulating region of the hydraulic actuator manipulation tool 21 can be made as wide as possible where the increase or decrease of the upper limit pressure can be controlled by the bypass valve 19, which can greatly contribute to the improvement of operability. On the other hand, when the upper limit pressure of the discharge line 2 is controlled so that the bypass valve 19 is fully closed when the manipulation amount becomes larger than when the maximum pressure of the discharge line 2 is reached, thereby attaining the reduction of energy loss.

Furthermore, in this the hydraulic control circuit, it is configured such that the stroke of the spool 19*c* with respect to the manipulation tool manipulation amount is controlled by the bypass valve control map 25 even in a state where the bypass valve 19 is fully closed, thereby enabling the control of the overlapping length between the land portion of the spool 19*c* (in a state where the bypass valve 19 is fully closed) and the sliding contact portion of the housing with which the land portion comes into sliding contact. In this case, it is configured such that a signal from the pump pressure sensor 23 that detects the pressure of the discharge line 2 of the hydraulic pump 1 is input to the controller 15, and the overlapping length is changed in accordance with the pressure of the discharge line 2, by changing the bypass valve control map 25 in accordance with the input pressure of the discharge line 2. This will enable preventing oil leakage from the bypass valve 19 by increasing the overlapping length even when the discharge line 2 has a high pressure, resulting in contribution to the reduction of energy loss.

Next, the second embodiment of the present invention will be described with reference to FIGS. 6 to 9. Elements in the second embodiment identical to those in the first embodiment are designated by the same reference numerals and therefore a description thereof will be omitted.

Figure 6:
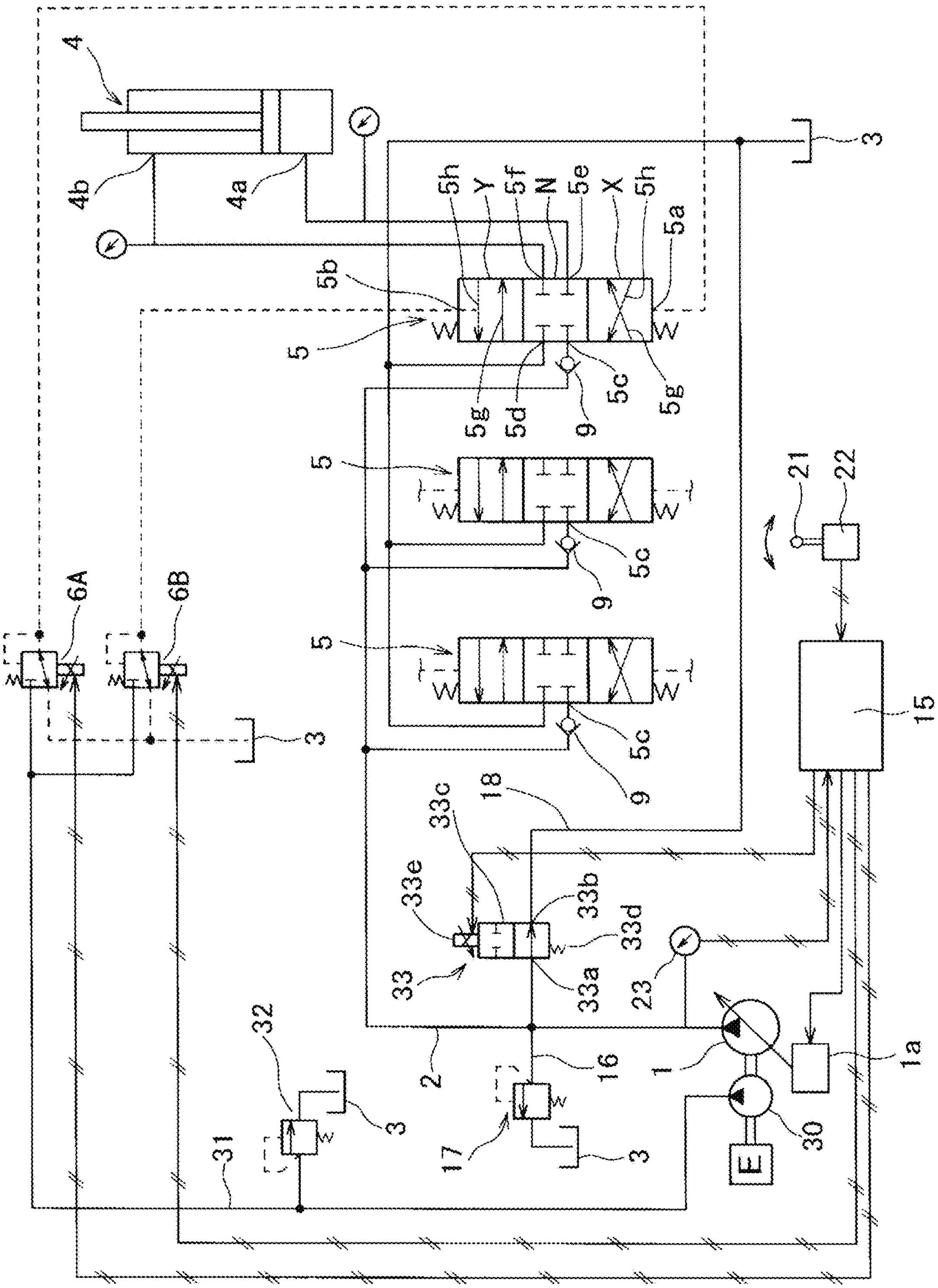
FIG. 6 is a hydraulic control circuit diagram of a second embodiment.

FIG. 6 is a diagram illustrating an outline of the hydraulic control circuit of the second embodiment. In FIG. 6, reference numeral 30 denotes a pilot pump driven by the engine E, and the pilot primary pressure generated by the pilot pump 30 is supplied to the first and second electromagnetic proportional pressure-reducing valves 6A, 6B that output the pilot pressure to the control valve 5, via a pilot primary side oil passage 31 connected to the pilot pump 30. In other words, in the second embodiment, the hydraulic pump 1 which serves as an oil pressure supply source of the hydraulic actuator 4 and the pilot pump 30 which supplies the pilot primary pressure to the first and second electromagnetic proportional pressure-reducing valves 6A, 6B are separately provided. In FIG. 6, reference numeral 32 denotes a pilot relief valve for setting a circuit pressure of the pilot primary side oil passage 31.

Furthermore, in FIG. 6, reference numeral 33 denotes a bypass valve according to the second embodiment, and the bypass valve 33 is disposed in the bypass oil passage 18 which is formed so as to be branched from the discharge line 2 of the hydraulic pump 1 and reaches the oil tank 3, similarly to the first embodiment. Then, the bypass amount flowing from the hydraulic pump 1 to the oil tank 3 via the bypass oil passage 18 will be controlled by the bypass valve 33, and the bypass valve 33 includes an inlet side port 33*a* connected to the hydraulic pump 1, an outlet side port 33*b* connected to the oil tank 3, a housing (not illustrated) having these inlet side and outlet side ports 33*a*, 33*b*, a spool 33*c* inserted into the housing so as to be freely movable in the axial direction, a spring 33*d* provided on one end side of the spool 33*c* and urging the spool 33*c* to the initial position, a proportional solenoid 33*e* provided on the other end side of the spool 33*c*, causing the spool 33*c* to move against the urging force of the spring 33*d*, and the like. Then, an increase or decrease of a stroke (displacement amount from the initial position) of the spool 33*c* is controlled, in accordance with an increase or decrease control of an electric current value applied from the controller 15 to the proportional solenoid 33*e*. The bypass amount flowing from the hydraulic pump 1 to the oil tank 3 via the bypass oil passage 18 is controlled, in accordance with the opening area of the bypass valve 33 corresponding to the stroke.

Figure 7:
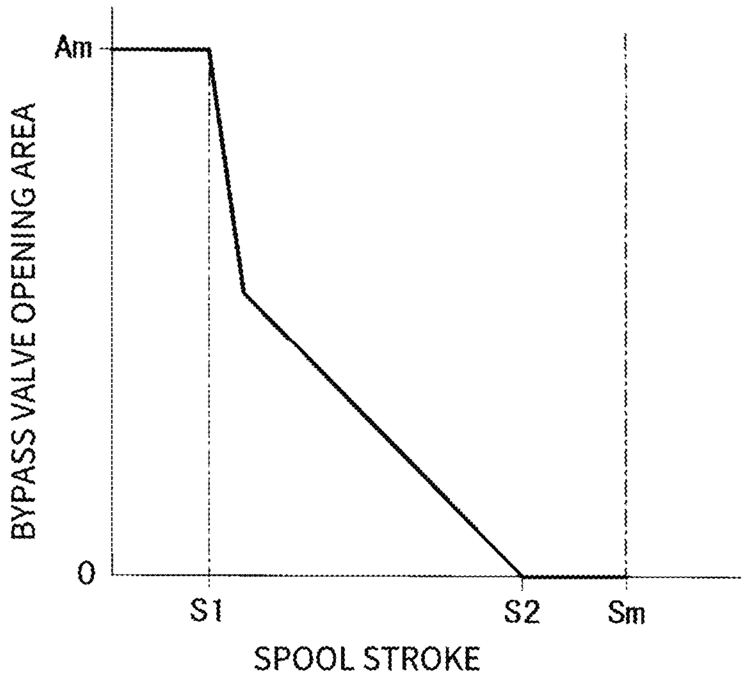
FIG. 7 is a diagram representing a relationship between a spool stroke and a bypass valve opening area in the second embodiment.

Meanwhile, the relationship between the stroke of the spool 33*c* of the bypass valve 33 and the opening area in the second embodiment will be described with reference to FIG. 7. When no electric current is applied to the proportional solenoid 33*e*, the spool 33*c* is located at an initial position (stroke "0") by the urging force of the spring 33*d*, but at the initial position, the opening area of the bypass valve 33 is set to become a maximum opening area Am. Then, the spool 33*c* is displaced from the initial position due to an electric current being applied to the proportional solenoid 33*e*, and the stroke of the spool 33*c* increases with increasing current value applied to the proportional solenoid 33*e*. In this case, however, the opening area is maintained at the maximum opening area Am until the stroke reaches the first stroke S1 from the initial position, and the opening area is set to decrease as the stroke increases from the first stroke S1, and when the stroke reaches the second stroke S2 (S1<S2), the opening area A of the bypass valve 33 is set to "0", that is, to be fully closed. Then, this fully closed state (opening area A=0) will be maintained until the stroke further increases from the second stroke S2 and reaches the maximum stroke Sm (S2<Sm).

The stroke of the spool 33*c* of the bypass valve 33 is controlled in accordance with a current value applied from the controller 15 to the proportional solenoid 33*e*, but the control of the stroke of the bypass valve 33 by the controller 15 will be described. First, no electric current is applied to the proportional solenoid 33*e* from the controller 15, before the engine E is started, and the bypass valve 33 is located at an initial position by the urging force of the spring 33*d*. Furthermore, the opening area of the bypass valve 33 at the initial position is set to the maximum opening area Am as described above.

Furthermore, when the hydraulic actuator manipulation tool 21 is not manipulated, after the engine E is started, no electric current is applied to the proportional solenoid 33*e* from the controller 15, and the bypass valve 33 is maintained at the initial position, that is, the maximum opening area Am by the urging force of the spring 33*d*. On the other hand, when the hydraulic actuator manipulation tool 21 is manipulated, the controller 15 controls the stroke of the spool 33*c* of the bypass valve 33 by using a bypass control map 34 of the second embodiment.

Figure 8:
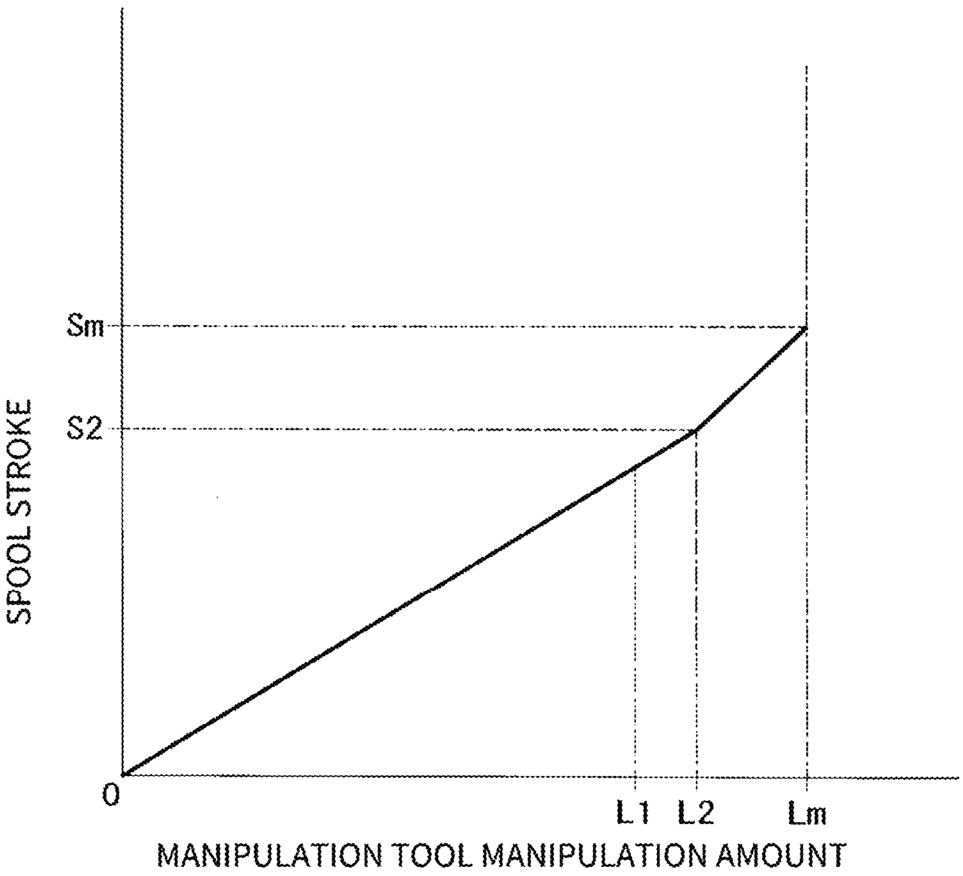
FIG. 8 is a diagram illustrating a bypass valve control map of the second embodiment.

The bypass valve control map 34, as illustrated in FIG. 8, is a map illustrating the relationship between the manipulation amount (manipulation tool manipulation amount) of the hydraulic actuator manipulation tool 21 that is input from the manipulation detecting means 22 and the stroke of the spool 33*c*, and is respectively set for each of the hydraulic actuators 4 and created in the same manner as in the first embodiment. In this case, however, the upper limit pump pressure (pump pressure in a state where a pressure oil is not supplied to the hydraulic actuator 4) when the manipulation tool manipulation amount is kept at the first manipulation amount L1 is set to reach the system pressure (the maximum pressure of the discharge line 2 set by the main relief valve 17) (see FIG. 4(B)), and when the manipulation tool manipulation amount is kept at the second manipulation amount L2 which is slightly increased larger than the first manipulation amount L1, the stroke is set to become the second stroke S2 at which the opening area of the bypass valve 33 becomes "0". In this case, the stroke of the spool 33*c* is controlled so that change in the opening area during the time until the opening area of the bypass valve 33 becomes "0" after the pump pressure having reached the system pressure is smoothly performed associated with an increase of the manipulation tool manipulation amount from the first manipulation amount L1 to the second manipulation amount L2, similarly to the first embodiment.

The control of the bypass valve 33 by the controller 15 using the bypass valve control map 34 will be described with reference to FIG. 8. In a state where the hydraulic actuator manipulation tool 21 is not manipulated (the manipulation tool manipulation amount "0", the manipulation tool at the neutral position), the stool 33*c* is controlled so as to stay at an initial position at which the opening area becomes the maximum opening area Am, as described above. Then, when the hydraulic actuator manipulation tool 21 is manipulated, the spool 33*c* is controlled so as to be displaced in a direction in which the stroke increases with an increasing manipulation tool manipulation amount, that is, in a direction in which the opening area of the bypass valve 33 decreases; and when the manipulation tool manipulation amount is manipulated up to the second manipulation amount L2, the spool 33*c* is controlled so as to reach the second stroke S2 at which the opening area of the bypass valve 33 becomes "0". Furthermore, the controller 15 controls the stroke of the spool 33*c* in accordance with the increase in the manipulation tool manipulation amount, similarly to the first embodiment, even after the opening area of the bypass valve 33 has become "0".

Meanwhile, the control of the stroke of the spool 33*c* after the opening area of the bypass valve 33 has become "0" will be described with reference to a partial enlarged view of the bypass valve control map 34 illustrated in FIG. 9. The controller 15 changes the bypass valve control map 34 in response to the present pump pressure of the discharge line 2 that is input from the pump pressure sensor 23, even in the second embodiment, after the opening area of the bypass valve 33 has become "0". In this case, when the pump pressure that is input from the pump pressure sensor 23 is higher (for example, 35 MPa) than the setting pressure which is set beforehand, even after the stroke of the spool 33*c* reaches the second stroke S2 at which the opening area of the bypass valve 33 becomes "0", as illustrated by the solid line in FIG. 9, the stroke of the spool 33*c* increases as the manipulation tool manipulation amount increases, that is, the spool 33*c* is set to be displaced in a direction of the maximum stroke Sm, and the spool 33*c* is set to reach the maximum stroke Sm when the manipulation tool manipulation amount becomes the maximum (maximum manipulation amount Lm). At the maximum stroke Sm, the overlapping length between the land portion of the spool 19*c* and the sliding contact portion of the housing that comes into sliding contact with the land portion is formed to be the longest, thereby reliably preventing oil leakage from the bypass valve 19 even when the pump pressure is high.

Figure 9:
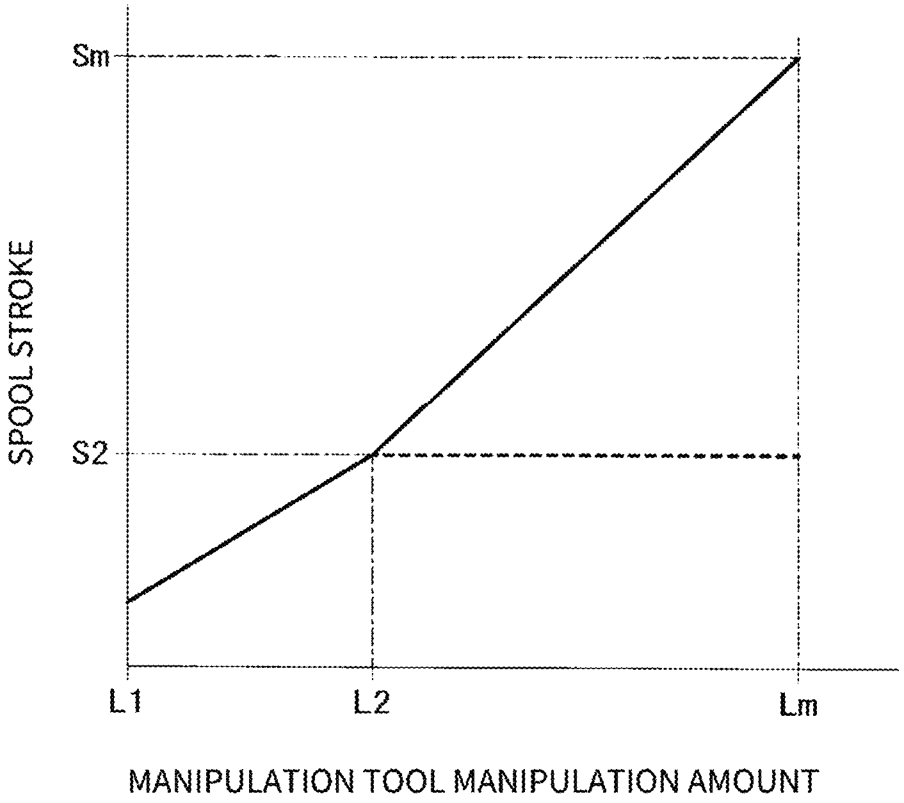
FIG. 9 is a diagram illustrating changes in the bypass valve control map in the second embodiment.

On the other hand, when the pump pressure that is input from the pump pressure sensor 23 becomes lower than the setting pressure, the bypass valve control map 34 is changed so that the displacement in a direction from the second stroke S2 toward the maximum stroke Sm after the opening area of the bypass valve 33 has become "0", decreases as the pump pressure becomes low, and is set so that, when the pump pressure is sufficiently low (for example, 5 MPa), the spool 33*c* is located at the second stroke S2, even when the manipulation tool manipulation amount reaches a maximum manipulation amount Lm, as illustrated by the dotted line in FIG. 9. As a result, when the pump pressure is low enough to prevent the risk of leakage of the spool 33*c*, the spool 33*c* will be immediately moved in a direction of the first stroke S1 to open the opening of the bypass valve 33 with a decreasing manipulation amount of the manipulation tool, resulting in good responsiveness of the bypass valve 33 to the manipulation of the manipulation tool.

Therefore, the bypass valve 33 of the second embodiment adopts a configuration in which the opening area decreases with an increase of the stroke of the spool 33*c*, and the spool stroke of the bypass valve 33 increases as the manipulation amount of the hydraulic actuator manipulation tool 21 increases. Although the spool stroke is configured to increase, even in the second embodiment in which the bypass valve 33 configured in this way is used, the upper limit pressure of the discharge line 2 will be controlled so that the opening area of the bypass valve 19 is fully closed, at the second manipulation amount L2 which is larger than the first manipulation amount L1 at which the discharge line 2 reaches the maximum pressure, which will exhibit the same action and effect as those of the first embodiment, thereby contributing to the improvement of operability and the reduction of energy loss.

INDUSTRIAL APPLICABILITY

The present invention can be utilized to control a bypass valve provided in a hydraulic control circuit of a work machine such as a hydraulic excavator.

The invention claimed is:

1. A hydraulic control circuit for a work machine, the hydraulic control circuit comprising: a hydraulic pump; a hydraulic actuator to which a pressure oil supplied from the hydraulic pump; a manipulation tool that is manipulated so as to actuate the hydraulic actuator, a control valve that is connected to a discharge line of the hydraulic pump, and configured to perform oil supply and discharge control to/from the hydraulic actuator, in accordance with the manipulation of the manipulation tool; a main relief valve configured to set a maximum pressure of the discharge line; a bypass oil passage that is formed so as to be branched from the discharge line and reaches an oil tank; and a spool type bypass valve disposed on the bypass oil passage, and configured to control a bypass amount flowing from the hydraulic pump to the oil tank in response to a control signal that is output from a control device, wherein, the bypass valve is configured such that an opening area increases or decreases associated with displacement of the spool, in controlling so that an upper limit pressure of the discharge line becomes a pressure corresponding to a manipulation tool manipulation amount by controlling an increase or decrease of a bypass amount in accordance with a manipulation tool manipulation amount; the control device is provided with a map representing a relationship between a manipulation tool manipulation amount and a spool displacement amount, and controls the spool displacement amount of the bypass valve as a function of the manipulation tool manipulation amount, on the basis of the map; and the map is set such that the upper limit pressure of the discharge line is a pressure corresponding to a spool displacement amount that causes the opening area of the bypass valve to be fully closed by a manipulation amount larger than the manipulation tool manipulation amount at which the maximum pressure of the discharge line is reached, wherein the control device is configured to vary the overlapping length between a land portion of the spool of the bypass valve and a sliding contact portion of a housing in the fully closed state of the bypass valve according to the pressure of the discharge line, by inputting a signal from a pressure detecting means for detecting the pressure of the discharge line of the hydraulic pump and varying the map according to the input pressure of the discharge line.

2. The hydraulic control circuit for a work machine according to claim 1, configured to control the spool displacement amount as a function of the manipulation tool manipulation amount by using the map even in the fully closed state of the bypass valve, in order to control an overlapping length between the land portion of the spool of the bypass valve and the sliding contact portion of a housing with which the land portion comes into sliding contact in the fully closed state of the bypass valve.

* * * * *